(12) United States Patent
Nieh et al.

(10) Patent No.: US 7,352,212 B2
(45) Date of Patent: Apr. 1, 2008

(54) OPPOSITE-PHASE SCHEME FOR PEAK CURRENT REDUCTION

(75) Inventors: Yow-Tyng Nieh, Hsinchu (TW); Sheng-Yu Hsu, Hsinchu (TW); Shih-Hsu Huang, Chung Li (TW); Yeong-Jar Chang, Hsinchu (TW)

(73) Assignees: Industrial Technology Research Institute, Hsinchu (TW); Chung Yuan Christian University, Chung Li (TW)

( * ) Notice: Subject to any disclaimer, the term of this patent is extended or adjusted under 35 U.S.C. 154(b) by 112 days.

(21) Appl. No.: 11/285,007

(22) Filed: Nov. 23, 2005

(65) Prior Publication Data

US 2007/0040596 A1 Feb. 22, 2007

(30) Foreign Application Priority Data

Aug. 17, 2005 (TW) ............................... 94128109 A

(51) Int. Cl.
*H03K 19/00* (2006.01)
(52) U.S. Cl. ............................ 326/93; 326/95; 326/96
(58) Field of Classification Search ................ 326/93, 326/95, 98–99, 96
See application file for complete search history.

(56) References Cited

U.S. PATENT DOCUMENTS 5,668,484 A * 9/1997 Nomura ........................ 326/93
5,703,498 A 12/1997 Gould et al.
6,433,605 B1 8/2002 Zhang
6,449,820 B2 * 9/2002 Tanaka et al. ................ 28/200
6,502,222 B1 12/2002 Tetelbaum
6,559,701 B1 5/2003 Dillon
6,681,373 B1 * 1/2004 Zolotykh et al. .............. 716/2
6,795,954 B2 9/2004 Andreev et al.
6,879,185 B2 4/2005 Swami et al.

FOREIGN PATENT DOCUMENTS

TW 307944 6/1997
TW 494290 7/2002
TW 530521 5/2003

OTHER PUBLICATIONS

Nieh et al., *Mininmizing Peak Current via Opposite-Phase Clock Tree*, Jun. 13-17, 2005, DAC 2006, Anaheim CA, USA, p. 182-185.

* cited by examiner

*Primary Examiner*—Anh Q. Tran
(74) *Attorney, Agent, or Firm*—Rabin & Berdo, P.C.

(57) ABSTRACT

We propose an opposite-phase scheme for peak current reduction. The basic idea is to divide the clock buffers at each level of the clock tree into two sets: one half of the clock buffers operate at the same phase as the clock source, and the other half of the clock buffers operate at the opposite phase to the clock source. Consequently, our approach can effectively reduce the peak current of the clock tree. The method enables the opposite-phase scheme to combine with the electronic design automation (EDA) tools that are commonly used in modern industries.

14 Claims, 10 Drawing Sheets

OPPOSITE-PHASE SCHEME FOR PEAK CURRENT REDUCTION

CROSS-REFERENCE TO RELATED APPLICATIONS

This non-provisional application claims priority under 35 U.S.C. § 119(a) on Patent Application No(s). 094128109 filed in Taiwan, R.O.C. on Aug. 17, 2005, the entire contents of which are hereby incorporated by reference.

BACKGROUND OF THE INVENTION

1. Field of Invention

The invention relates to a design method for reducing the peak current of a clock tree. Moreover, the invention pertains to integrated circuit (IC) designs and the related electronic design automation (EDA) tools.

2. Related Art

The design of clock trees in digital chips has been previously focused on improving the chip efficiency. For example, U.S. Pat. Nos. 6,502,222 and 6,433,605 aimed at providing a clock tree with zero clock skew. The advantages of this type of designs are that the clock tree is easier to implement and that the clock analysis of the chips is simpler. However, once power consumption became an important issue in the chip design, the clock tree with a selective enable clock had been disclosed in U.S. Pat. Nos. 6,879,185 and 5,703,498. This type of techniques is to shut down the clock that is currently not operating in a timing circuit in order to reduce unnecessary dynamic power waste. This can achieve the goal of reducing the overall chip power consumption. Nevertheless, to appropriately control the clock, the entire clock tree has to be added with an additional control circuit and therefore increases the complexity in implementing the clock tree.

For a timing circuit, its peak current comprises three parts: one is the synchronous logic, another is the combinational logic, and the other is the clock tree.

To reduce the peak current of a chip, traditionally the most common method is to use the clock tree with a non-zero clock skew in order to reduce the peak current in the synchronous logic. Such a scheme was disclosed in U.S. Pat. Nos. 6,795,954 and 6,559,701. This scheme uses different clock arrival times to properly adjust the trigger time of the synchronous logic. Therefore, the current consumption of individual synchronous logics is separated to reduce the peak current.

Consequently, how to effectively reduce the peak current of a clock tree has been an intriguing topic in the field.

SUMMARY OF THE INVENTION

The invention discloses a method for peak current reduction. A main idea is to divide the clock buffers at each level of the clock tree into two sets: one half of the clock buffers operate at the same phase as the clock source, and the other half of the clock buffers operate at the opposite phase to the clock source. Many clock trees of different combinations can be derived from this idea. Their common feature is to match the clock variation with the corresponding clock buffers. The charging and discharging proportions in the peak current are adjusted evenly to reduce the peak current.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The function of the buffer in a digital circuit is to enhance the strength of signals. The buffer in a clock tree is called a clock buffer. The output of a clock buffer is usually used to drive several clock buffers. Therefore, the most important function of a clock tree is to ensure the consistency of the clock strength and the clock arrival time.

Figure 1A:
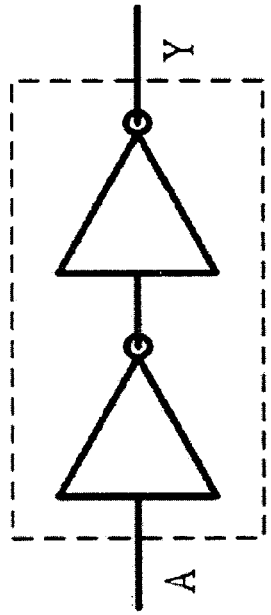
FIG. 1(a) is a schematic view of the circuit symbol of the clock buffer.
Figure 1B:
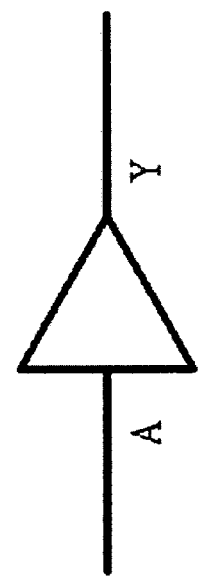
FIG. 1(b) is a block diagram of the clock buffer.
Figure 1C:
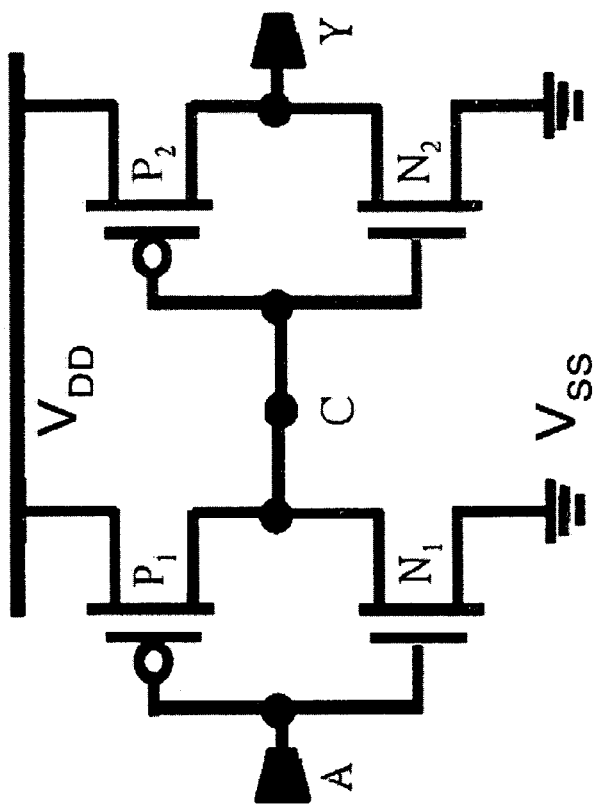
FIG. 1(c) is a circuit diagram of the clock buffer.

FIG. 1(a) shows the circuit symbol of the clock buffer. A clock buffer consists of two inverters. FIG. 1(b) shows its block diagram, and FIG. 1(c) is the circuit diagram. Terminal A is the input of the clock buffer, terminal Y is the output of the clock buffer, and terminal C is the middle point of the two inverters.

Figure 2:
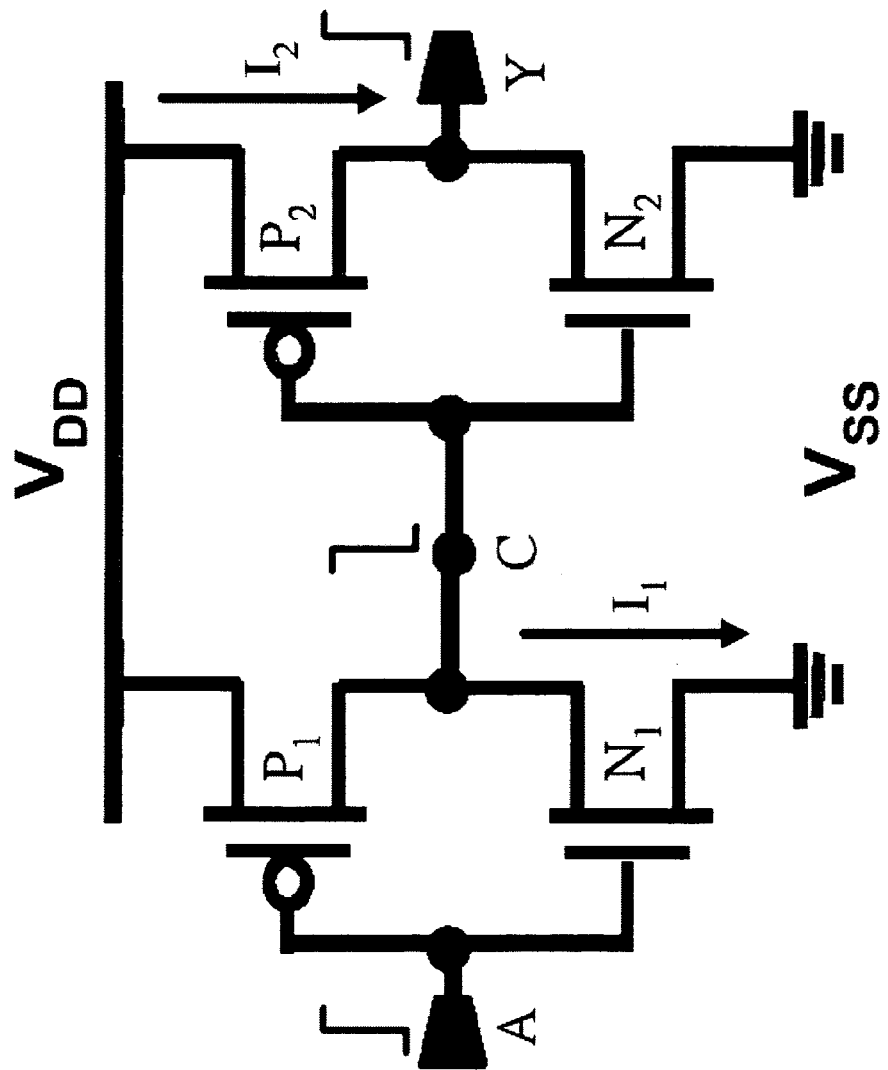
FIG. 2 is a schematic view showing the charging and discharging currents of a clock buffer.

Let's observe the current consumption of the clock buffer when a clock enters. When the clock signal changes from 0 to 1 (rising edge), PMOS $P_1$ is off while NMOS $N_1$ is on. The potential of terminal C produces a discharging effect because of the conduction of NMOS $N_1$, and the current $I_1$ flows out of VSS. PMOS $P_2$ is on while NMOS $N_2$ is off. The potential of the output terminal Y produces a charging effect because of the conduction of PMOS $P_2$, and the current $I_2$ flows in via VDD. Since the output terminal of the clock buffer is connected to several clock buffers, the effective capacitance of terminal Y must be larger than that of terminal C, and the current $I_2$ is an integer multiple of $I_1$. Therefore, during the process that the clock signal changes from 0 to 1, the charging effect of $I_2$ dominates the current consumption of the entire clock buffer, as illustrated in FIG. 2.

Figure 3:
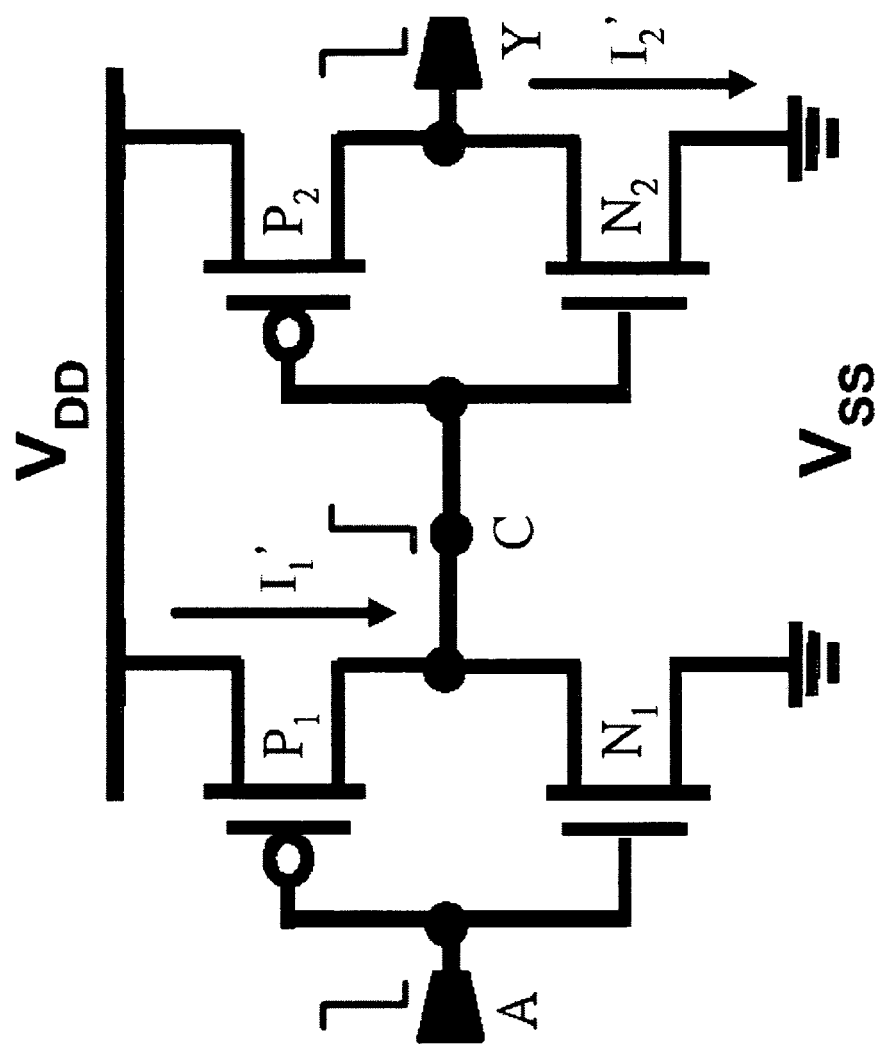
FIG. 3 is a schematic view showing the charging and discharging currents of a clock buffer.

When the clock changes from 1 to 0 (falling edge), PMOS $P_1$ is on while NMOS $N_1$ is off. The potential of terminal C produces a charging effect because of the conduction of PMOS $P_1$, and the current $I_1'$ flows in via VDD. PMOS $P_2$ is off while NMOS $N_2$ is on. The potential of the output terminal Y produces a discharging effect because of the conduction of NMOS $N_2$, and the current $I_2'$ flows out of VSS. Likewise, the current $I_2'$ must be an integer multiple of $I_1'$. Therefore, during the process that the clock changes from 1 to 0, the discharging effect of $I_2'$ dominates the current consumption of the entire clock buffer, as illustrated in FIG. 3.

To simplify the explanation, the influences of $I_1$ and $I_1'$ will be ignored in the following discussion. This assumption does not affect the effects of the invention.

Figure 4:
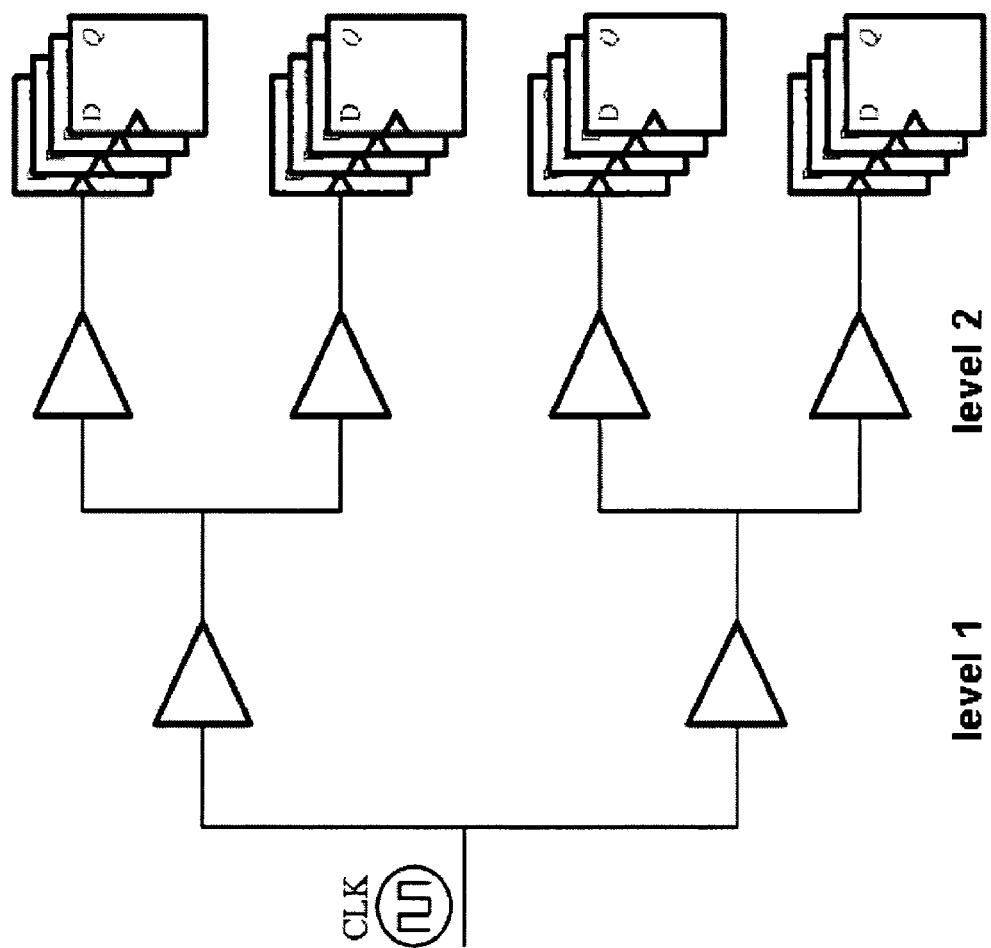
FIG. 4 is the system structure of a conventional binary clock tree.

A two-level binary clock tree is herein employed to explain the contents of the invention. Suppose all the buffers are positive-triggered D flip-flops, as shown in FIG. 4. Since the output clocks of all the clock buffers operate at the same phase as the clock source, during the process that the clock signal changes from 0 to 1 the current consumptions of the clock buffers in the binary clock tree are all charging. When the clock signal changes from 1 to 0, the current consumptions of the clock buffers in the binary clock tree are all discharging.

Figure 5:
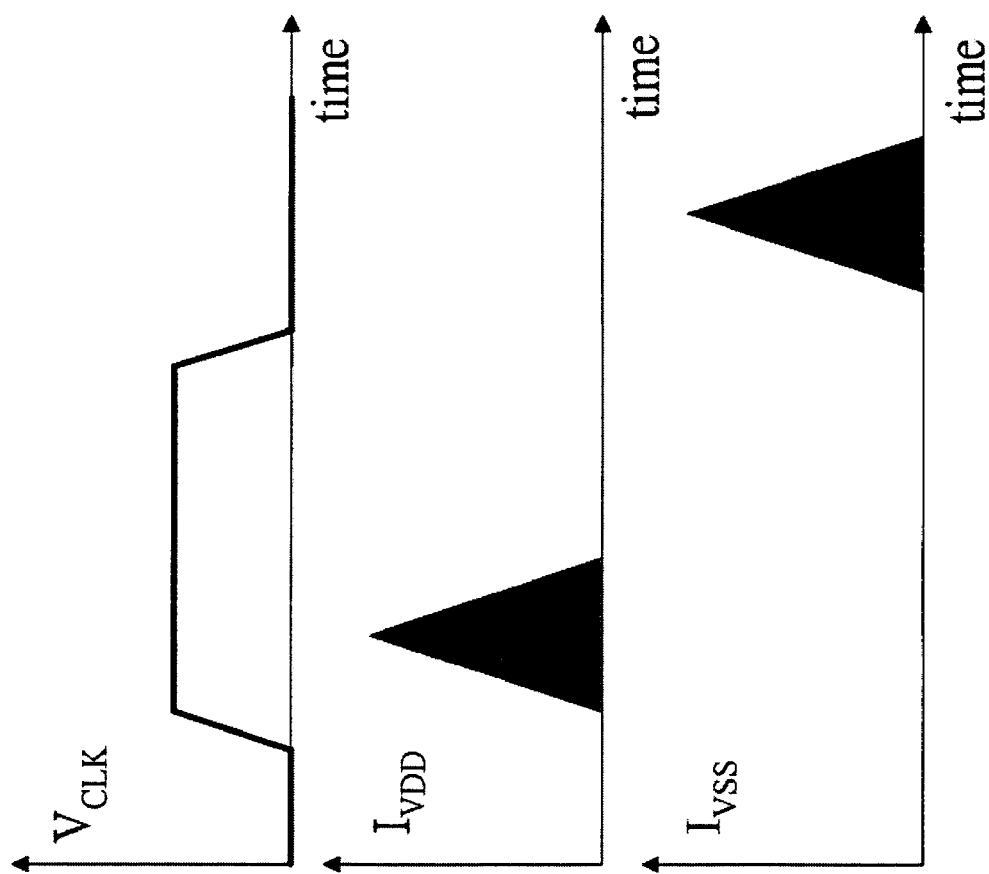
FIG. 5 is a schematic view of the conventional peak current consumption.

The peak current consumption can be clearly seen in FIG. 5. If all of the clock buffers operate at the same phase as the clock source, all of them charge and discharge at the same phase. In this case, the peak current of the clock tree cannot be distributed. Instead, its value increases.

In view of this, the invention provides a clock tree structure with an opposite-phase scheme. A primary purpose of the invention is to evenly adjust the proportion combination of charging and discharging in the peak current. A main idea is to divide the clock buffers at each level of the clock tree into two sets: one half of the clock buffers operate at the same phase as the clock source, whereas the other half of the clock buffers operate at the opposite phase to the clock source.

Figure 6:
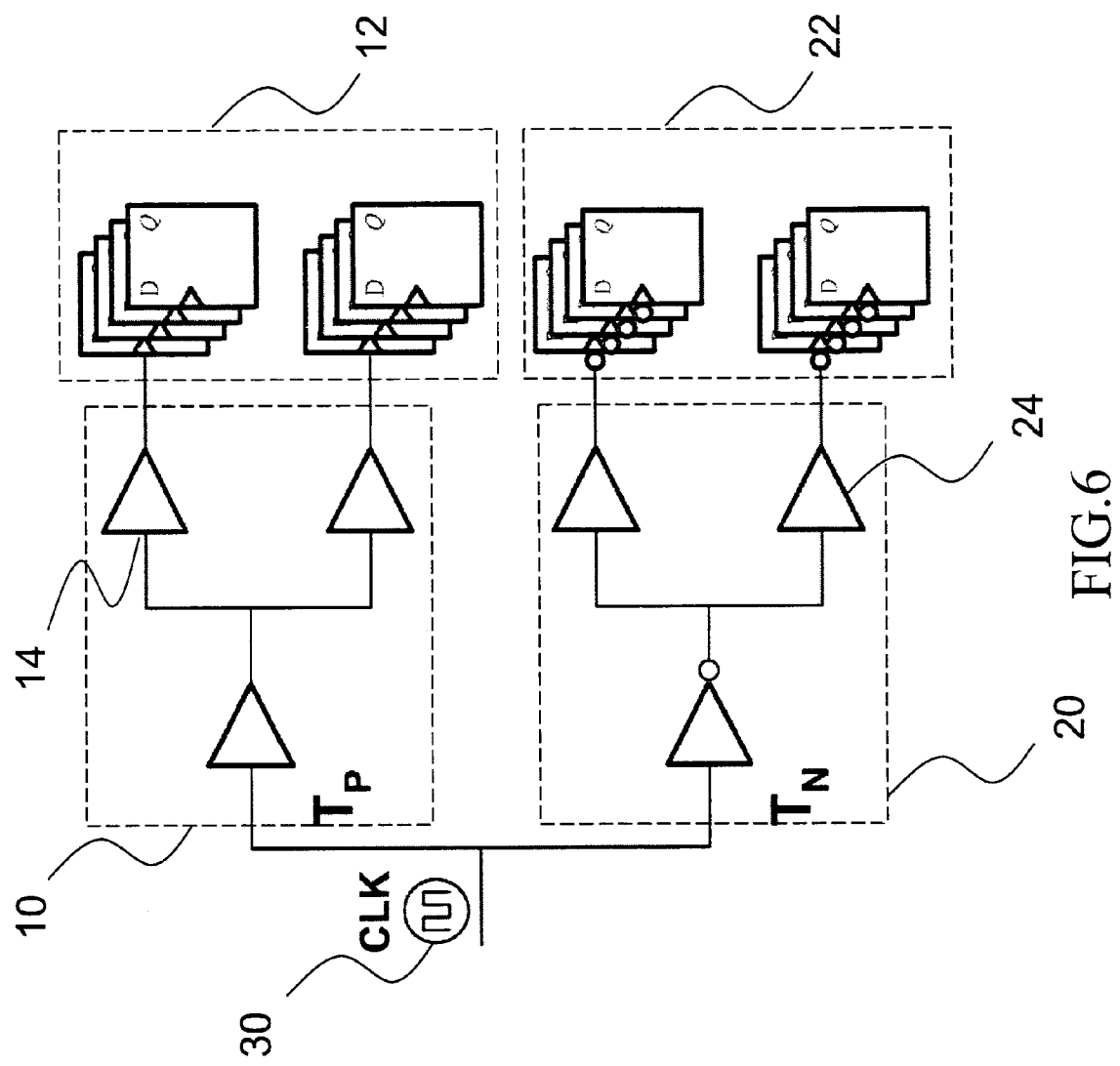
FIG. 6 is the system structure of the disclosed binary clock tree.
Figure 7:
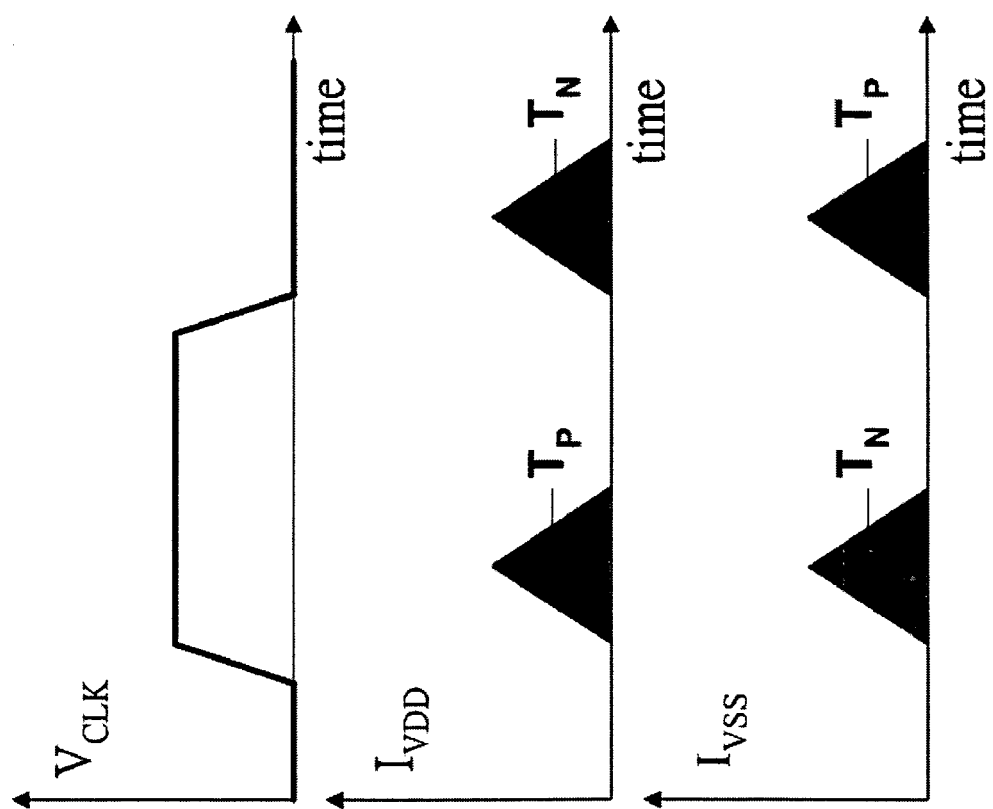
FIG. 7 is a schematic view of the peak current consumption according to the invention.

For example, the binary clock tree in FIG. 4 can be implemented according to the above-mentioned idea as in FIG. 6. The binary clock tree in FIG. 6 is divided into two sets. $T_P$ is called a same-phase clock tree 10, whereas $T_N$ is called an opposite-phase clock tree 20. The output terminal of the same-phase clock tree 10 is a positive-triggered flip-flop 12. The output terminal of the opposite-phase clock tree 20 is a negative-triggered flip-flop 22. The disclosed binary clock tree further includes a clock source 30 to provide a clock signal. Therefore, the output signal of the clock buffers 14 in the same-phase clock tree 10 is the same as that of the clock signal. The output signal of the clock buffers 24 in the opposite-phase clock tree 20 is opposite to that of the clock signal. As a result, whether the clock signal changes from 0 to 1 or from 1 to 0, one set of the clock buffers in the $T_P$ and $T_N$ sets is charging while the other one is discharging. Therefore, the charging and discharging proportions of the peak current are evenly distributed, and the peak current of the entire clock tree can be effectively reduced. FIG. 7 shows the current consumption in the new binary clock tree. It can be seen in the drawing that the peak current is effectively distributed. In the most ideal situation, the peak current can be reduced by about 50%.

Figure 8:
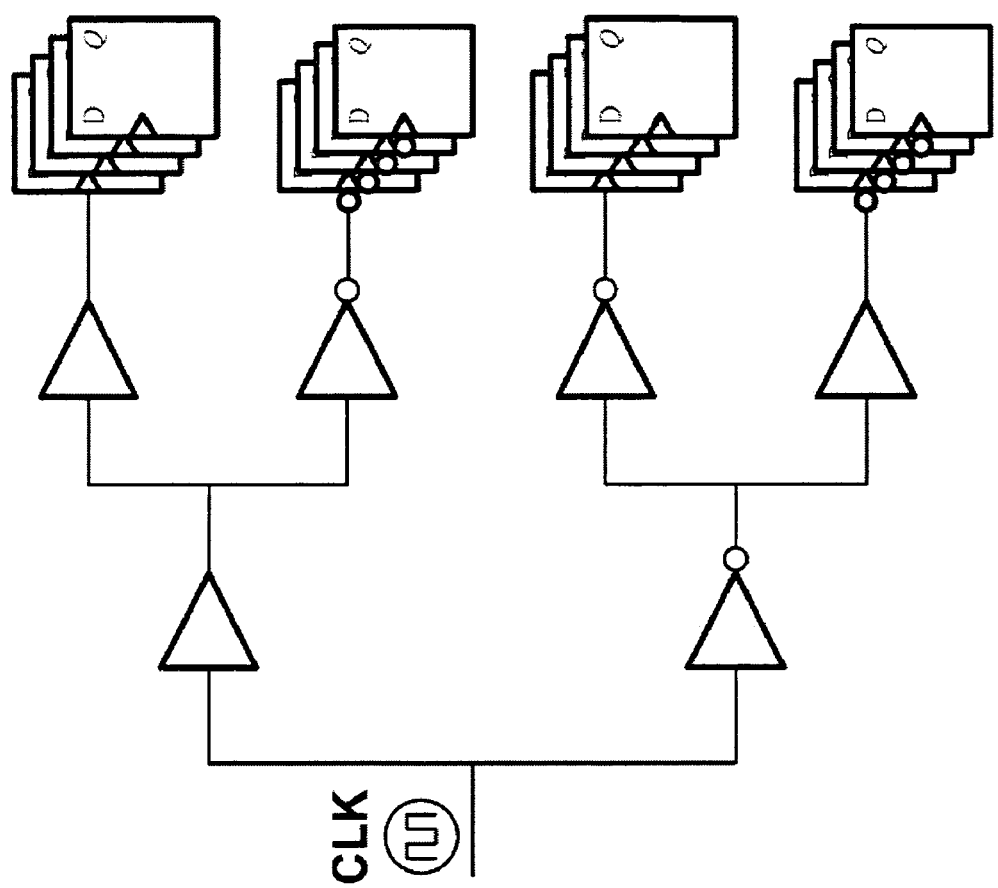
FIG. 8 is the system structure of another binary clock tree.

It should be emphasized that the opposite-phase clock tree structure in FIG. 6 only represents one embodiment of the invention. Many different combinations of the clock trees can be derived from the above idea. The basic feature is to match the clock variation with the corresponding clock buffers. The charging and discharging proportions in the current at approximate synchronization are adjusted evenly to reduce the peak current. For example, FIG. 8 illustrates another opposite-phase clock tree complying with the invention but with a different combination.

The invention provides two sets of IC design procedures to implement the disclosed clock tree with an opposite-phase scheme. The two sets of IC design procedures can be accomplished with existing EDA utilities. Their difference is whether the opposite-phase clock tree is constructed before or after clock tree synthesis (CTS).

Figure 9A:
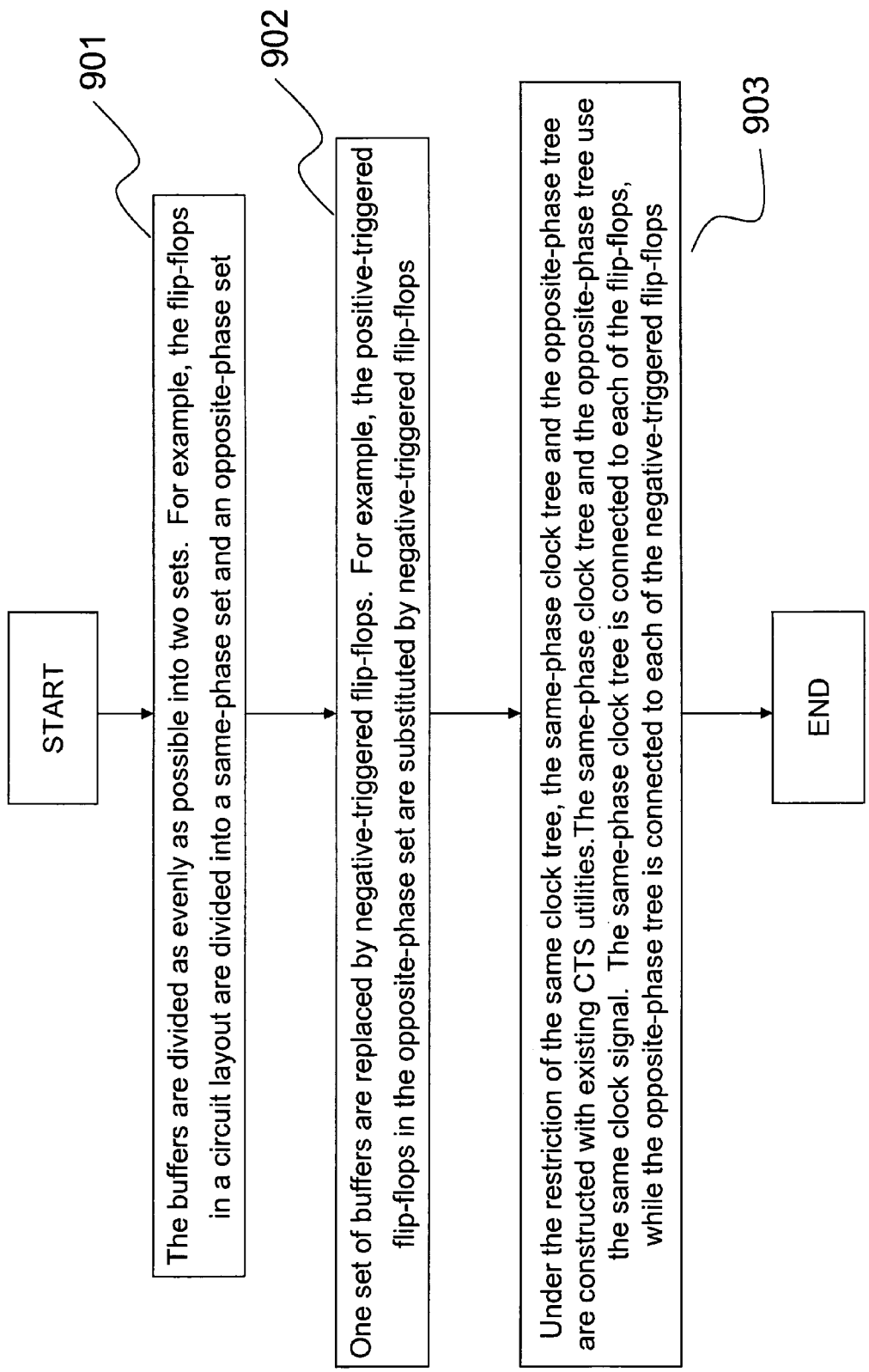
FIG. 9A is a design flowchart before the CTS according to the invention.

The design procedure of constructing the opposite-phase clock tree before the CTS mainly includes the steps of dividing the flip-flop sets, placement of the flip-flops of the opposite-phase clock tree, and constructing the clock tree, as illustrated in FIG. 9A.

First, suppose the buffers in the circuit are all positive-triggered flip-flops. However, this assumption is unnecessary and should not be used to restrict the scope of the invention. The buffers are divided as evenly as possible into two sets. For example, the flip-flops in a circuit layout are divided into a same-phase set and an opposite-phase set (step 901). One set of buffers are replaced by negative-triggered flip-flops. For example, the positive-triggered flip-flops in the opposite-phase set are substituted by negative-triggered flip-flops (step 902). Under the restriction of the same clock tree, the same-phase clock tree and the opposite-phase tree are constructed with existing CTS utilities. The same-phase clock tree and the opposite-phase tree use the same clock signal. The same-phase clock tree is connected to each of the flip-flops, while the opposite-phase tree is connected to each of the negative-triggered flip-flops (step 903). Finally, detailed adjustments are performed to make the timing efficiency of the entire clock tree compliant with the constraint of the original clock tree.

Figure 9B:
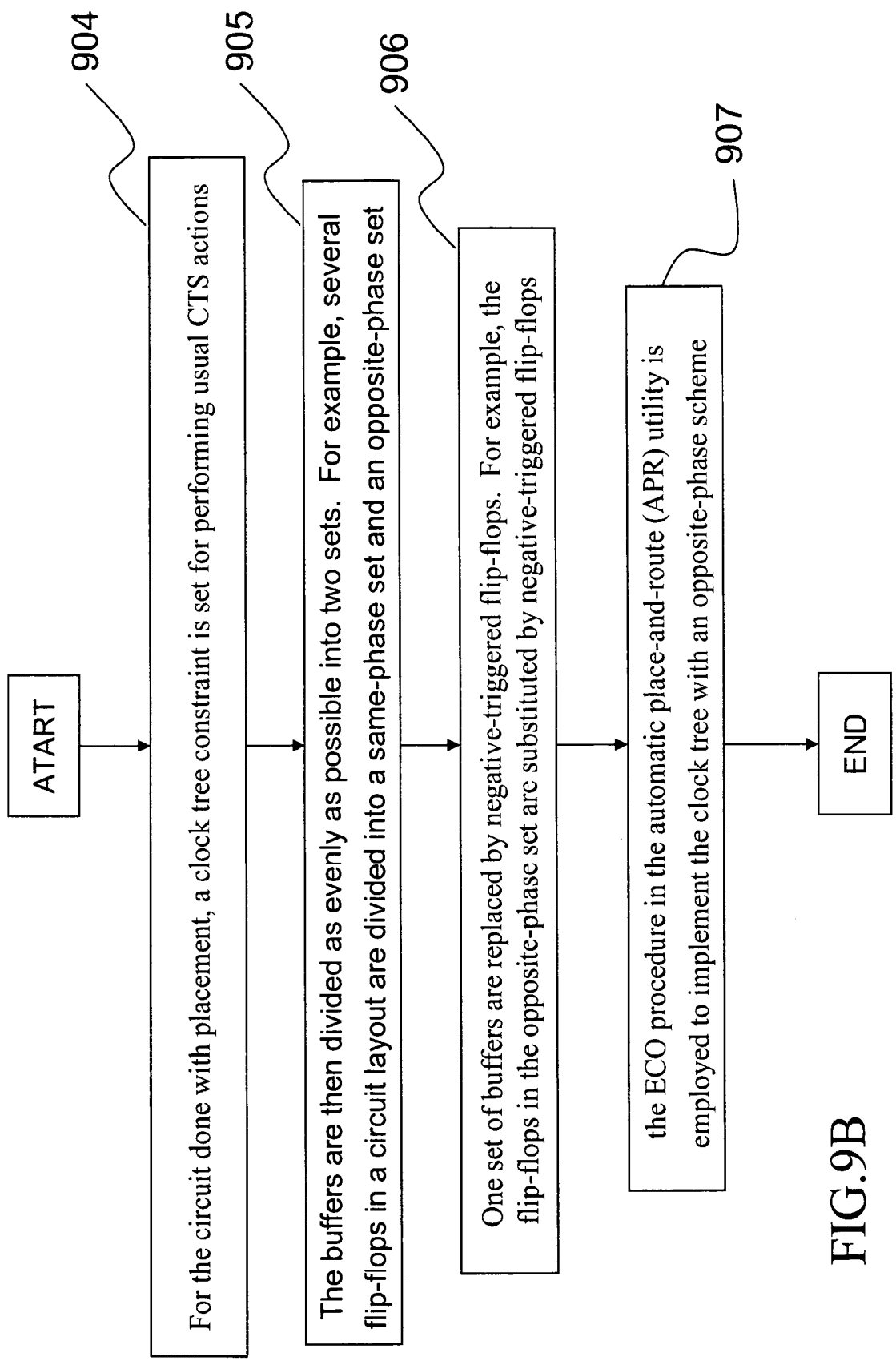
FIG. 9B is a design flowchart after the CTS according to the invention.

In the following, we explain the IC design procedure of constructing the opposite-phase clock tree using engineering change order (ECO) after the CTS. Its main procedure includes the steps of: clock tree synthesis, dividing the flip-flops, placement of the flip-flops of the opposite-phase clock tree, and using the ECO procedure to construct the opposite-phase clock tree, as shown in FIG. 9B.

For the circuit done with placement, a clock tree constraint is set for performing usual CTS actions (step 904). The buffers are then divided as evenly as possible into two sets. For example, several flip-flops in a circuit layout are divided into a same-phase set and an opposite-phase set (step 905). One set of buffers are replaced by negative-triggered flip-flops. For example, the flip-flops in the opposite-phase set are substituted by negative-triggered flip-flops (step 906). Afterwards, the ECO procedure in the automatic place-and-route (APR) utility is employed to implement the clock tree with an opposite-phase scheme (step 907).

The above-mentioned two sets of IC design procedures can effectively utilize existing CTS utilities to implement the disclosed opposite-phase clock tree. However, it is even more efficient if the disclosed opposite-phase clock tree can be directly integrated inside the CTS utilities for the CTS utilities to generate the opposite-phase clock tree automatically. Therefore, any CTS utilities with this function in the future should be covered within the claims of the invention.

A wide-band chip for ADSL is used for tests. The 688 buffers in this chip are divided in two equal sets of positive- and negative-triggered flip-flops. The peak current is estimated using Synopsys PowerMill for circuit level current simulation. The results show that the peak current of the entire clock tree is reduced from 44.3 mA of the original clock tree down to 23.8 mA, a reduction of 46.3%. If one takes into account the current consumed by the flip-flops, the peak current is reduced from 74.1 mA to 42.4 mA, a reduction of 42.8%. Therefore, the invention achieves very good peak current reduction in actual chip application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clock tree with an opposite-phase scheme, comprising:
   a clock source for providing a clock signal;
   a plurality of flip-flops including at least one positive-triggered flip-flop and at least one negative-triggered flip-flop; and
   a plurality of clock buffers disposed between the clock source and the flip-flops;
   wherein at least one of the clock buffers is discharging at the approximation synchronization when at least one of the clock buffers is charging, so that the clock buffers transmit an output signal to the positive-triggered flip-flop and a complimentary signal to the negative-triggered flip-flop simultaneously.

2. The clock tree with an opposite-phase scheme of claim 1, wherein the clock buffer has two inverters.

3. The clock tree with an opposite-phase scheme of claim 2, wherein the inverter includes a PMOS transistor and an NMOS transistor.

4. The clock tree with an opposite-phase scheme of claim 1, wherein the clock buffer includes an inverter.

5. The clock tree with an opposite-phase scheme of claim 4, wherein the inverter includes a PMOS transistor and an NMOS transistor.

6. The clock tree with an opposite-phase scheme of claim 1, wherein each of the flip-flops is triggered by the clock signal simultaneously.

7. The clock tree with an opposite-phase scheme of claim 1, wherein each of the flip-flops is triggered by the complimentary signal of the clock signal simultaneously.

8. A clock tree with an opposite-phase scheme, comprising:
   a clock source for providing a clock signal;
   a plurality of flip-flops including at least one positive-triggered flip-flop and at least one negative-triggered flip-flop; and
   a plurality of clock buffers disposed between the clock source and the flip-flops;
   wherein at least one of the clock buffers operates at the opposite phase to the clock source at the approximation synchronization when at least one of the clock buffers operates at the same phase as the clock source, so that the clock buffers transmit an output signal to the positive-triggered flip-flop and a complimentary signal to the negative-triggered flip-flop.

9. The clock tree with an opposite-phase scheme of claim 8, wherein the clock buffer has two inverters.

10. The clock tree with an opposite-phase scheme of claim 9, wherein the inverter includes a PMOS transistor and an NMOS transistor.

11. The clock tree with an opposite-phase scheme of claim 8, wherein the clock buffer includes an inverter.

12. The clock tree with an opposite-phase scheme of claim 11, wherein the inverter includes a PMOS transistor and an NMOS transistor.

13. The clock tree with an opposite-phase scheme of claim 8, wherein each of the flip-flops is triggered by the clock signal simultaneously.

14. The clock tree with an opposite-phase scheme of claim 8, wherein each of the flip-flops is triggered by the complimentary signal of the clock signal simultaneously.

* * * * *